(12) United States Patent
Wong

(10) Patent No.: US 7,828,486 B1
(45) Date of Patent: Nov. 9, 2010

(54) SURVEILLANCE SYSTEM WITH WIND VIBRATION ISOLATING ENCLOSURE

(76) Inventor: Thomas K. Wong, 795 Panorama Dr., San Francisco, CA (US) 94131

( * ) Notice: Subject to any disclaimer, the term of this patent is extended or adjusted under 35 U.S.C. 154(b) by 246 days.

(21) Appl. No.: 12/221,041

(22) Filed: Jul. 30, 2008

(51) Int. Cl.
*G03B 17/00* (2006.01)

(52) U.S. Cl. .................................................... 396/427

(58) Field of Classification Search ............... 396/427, 396/433; 348/143, 148–151
See application file for complete search history.

(56) References Cited

U.S. PATENT DOCUMENTS

| 1,643,955 | A | 10/1927 | Rank et al. |
|---|---|---|---|
| 4,320,949 | A | 3/1982 | Pagano |
| 4,736,218 | A | 4/1988 | Kutman |
| 5,231,435 | A | 7/1993 | Blakely |
| 5,335,471 | A | 8/1994 | Kupiec |
| 5,563,659 | A | 10/1996 | Bernhardt et al. |
| 5,689,304 | A | 11/1997 | Jones et al. |
| 5,881,528 | A | 3/1999 | Grewe et al. |
| 6,061,087 | A | 5/2000 | Schieltz et al. |
| 6,192,646 | B1 | 2/2001 | Grewe et al. |
| 6,213,452 | B1 | 4/2001 | Pettit et al. |
| 6,305,670 | B1 | 10/2001 | Ward et al. |
| 6,554,499 | B1 * | 4/2003 | Gumpenberger ............ 396/427 |
| 6,643,456 | B1 | 11/2003 | Ryan et al. |
| 6,894,724 | B2 | 5/2005 | Patel et al. |
| 7,066,663 | B2 | 6/2006 | Cheng |
| 7,243,473 | B2 | 7/2007 | Terrels |
| 7,382,400 | B2 | 6/2008 | Sablak |
| 2004/0066451 | A1 * | 4/2004 | Schroth ...................... 348/144 |
| 2009/0185036 | A1 * | 7/2009 | Bowron ...................... 348/151 |

* cited by examiner

*Primary Examiner*—W. B. Perkey
(74) *Attorney, Agent, or Firm*—Thomas R. Lampe

(57) ABSTRACT

Surveillance apparatus including an elongated base anchor structure, elongated core structure carrying surveillance equipment and having a lower end fixed against movement relative to the ground, and an elongated enclosure attached to the base anchor structure and surrounding the elongated core structure and the surveillance equipment, the elongated core structure and the surveillance equipment structurally isolated from the elongated enclosure and protected from vibration caused by wind impacting the elongated enclosure.

28 Claims, 6 Drawing Sheets

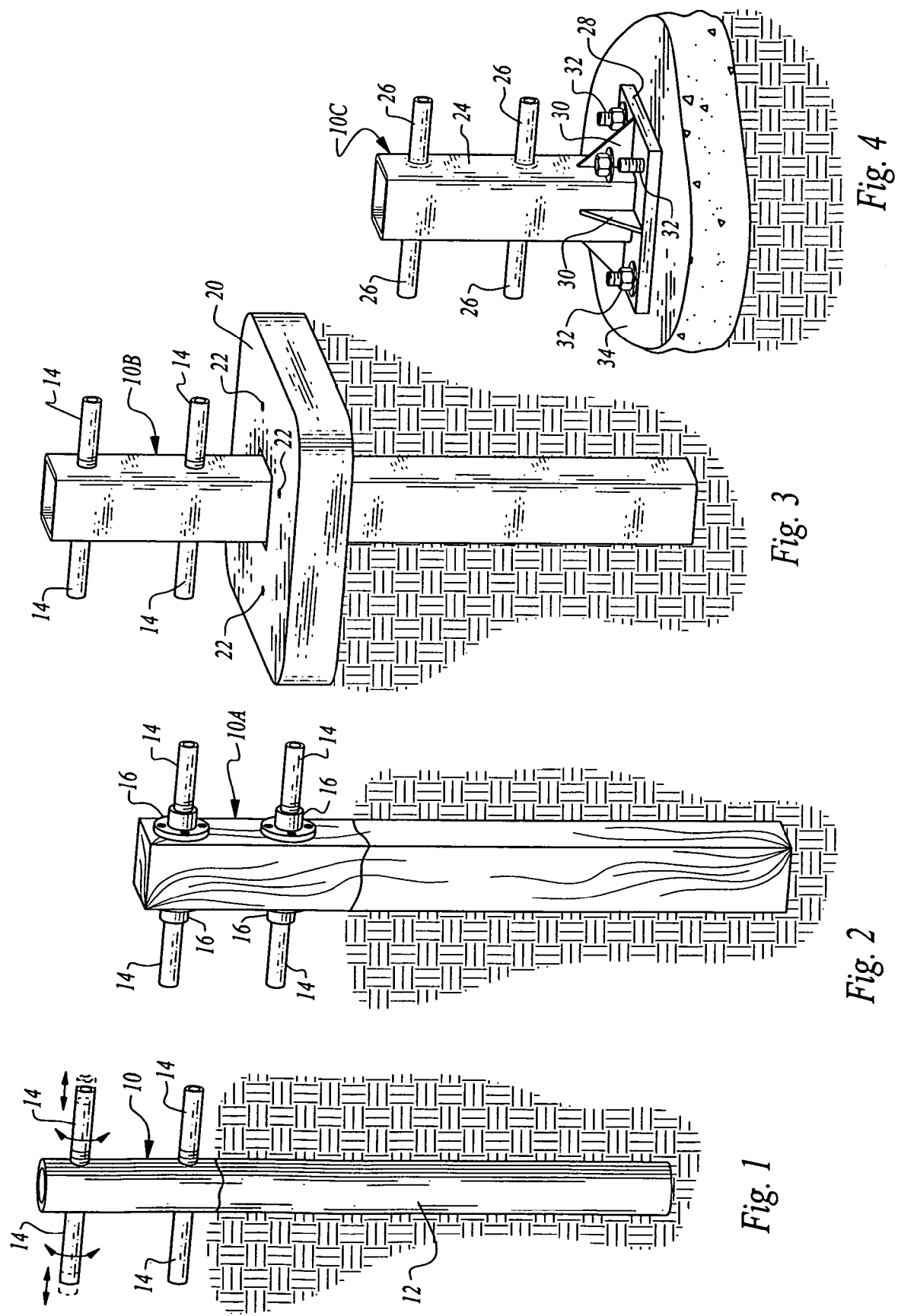

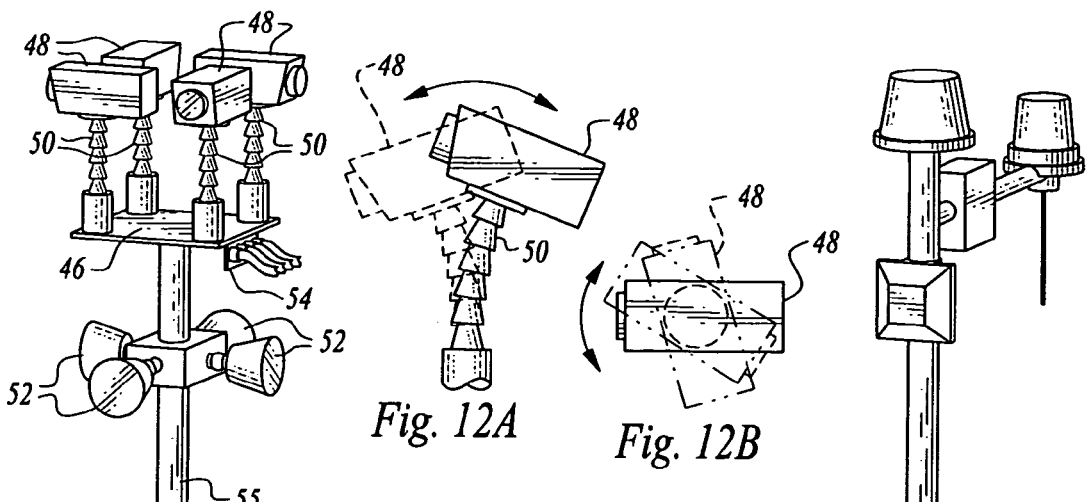
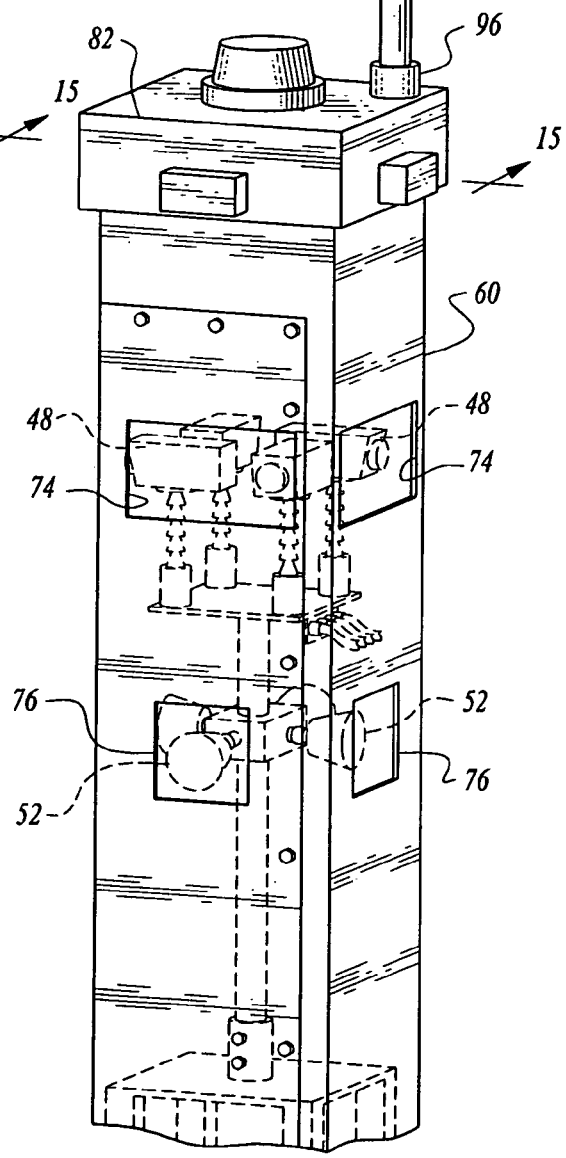
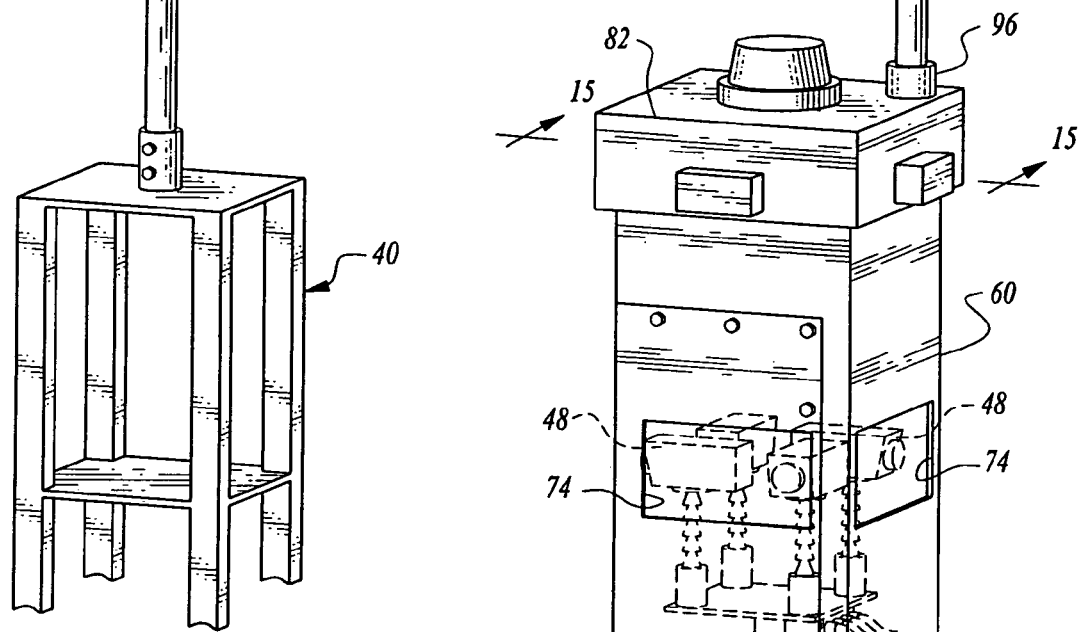
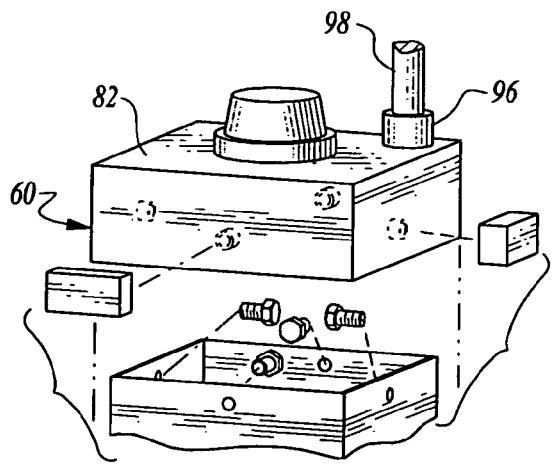
Fig. 11
Fig. 12A
Fig. 12B
Fig. 14
Fig. 13

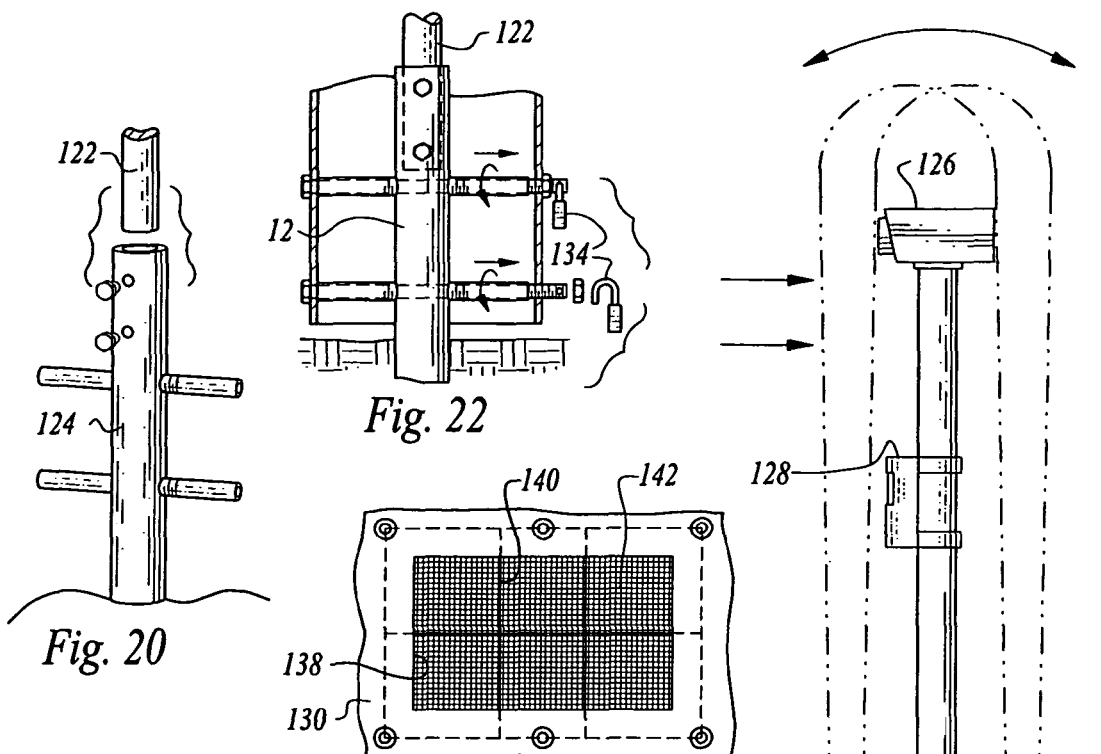
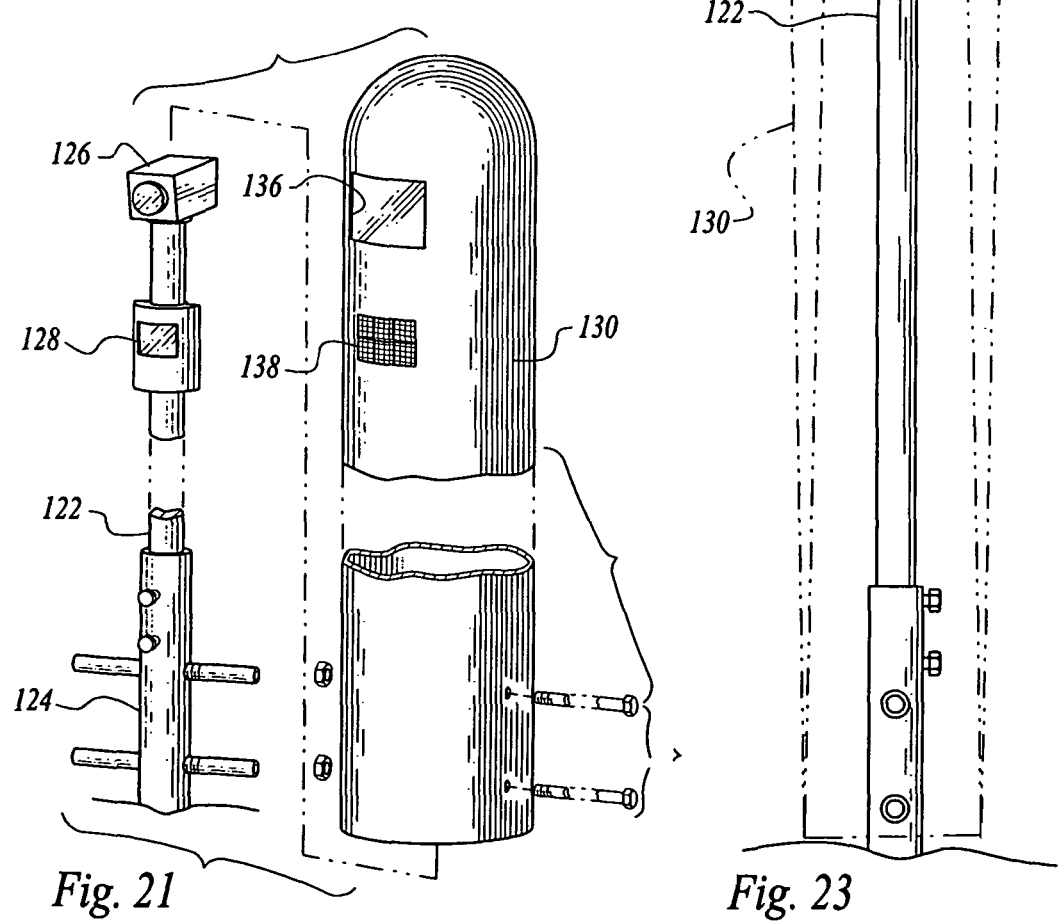

SURVEILLANCE SYSTEM WITH WIND VIBRATION ISOLATING ENCLOSURE

TECHNICAL FIELD

This invention relates to surveillance systems and more particularly outdoor surveillance systems.

BACKGROUND OF THE INVENTION

When cameras and sensors are mounted on a pole, vibration of the pole caused by wind creates blurry and shaky images, which are difficult to see clearly. When these sensors or cameras are used for motion detection, the wind vibration creates false motion alarms. Further, in many instances, each camera, sensor or other piece of equipment requires its own enclosure for protection from the elements or vandalism. These outdoor enclosures are expensive; multiple enclosures add significant cost to a system. In addition, the cost of a pole and its installation are also high.

The following patents are believed to show the current state of the prior art in this field: U.S. Pat. No. 4,736,218, issued Apr. 5, 1988, U.S. Pat. No. 5,689,304, issued Nov. 18, 1997, U.S. Pat. No. 7,243,473, issued Jul. 17, 2007, U.S. Pat. No. 6,213,452, issued Apr. 10, 2001, U.S. Pat. No. 6,192,646, issued Feb. 27, 2001, U.S. Pat. No. 5,881,528, issued Mar. 16, 1999, U.S. Pat. No. 6,061,087, issued May 9, 2000, U.S. Pat. No. 6,643,456, issued Nov. 4, 2003, U.S. Pat. No. 5,563,659, issued Oct. 8, 1996, U.S. Pat. No. 6,894,724, issued May 17, 2005, U.S. Pat. No. 4,320,949, issued Mar. 23, 1982, U.S. Pat. No. 1,643,955, Oct. 4, 1927, U.S. Pat. No. 6,305,670, issued Oct. 23, 2001, U.S. Pat. No. 5,335,471, issued Aug. 9, 1994, U.S. Pat. No. 7,066,663, issued Jun. 27, 2006, U.S. Pat. No. 5,231,435, issued Jul. 27, 1993 and U.S. Pat. No. 7,382,400, issued Jun. 3, 2008.

One of these patents, U.S. Pat. No. 4,736,218, is somewhat pertinent to the present invention since it discloses a surveillance device in which an adjustable camera is supported by an inner post. The camera is located within the interior of a spherical housing having a window, the spherical housing being supported by a sleeve-like support which extends downwardly and surrounds the inner post. The sleeve-like support is mechanically isolated and spaced-apart from the inner post. As will be seen below, the invention disclosed and claimed herein incorporates many unique structural features and cooperative relationships not taught or suggested by U.S. Pat. No. 4,736,218 or the other patents noted above.

DISCLOSURE OF INVENTION

The present invention relates to surveillance apparatus including base anchor structure extending upwardly from the ground or other support.

The apparatus includes elongated core structure having a lower end and an upper end, the lower end fixed against movement relative to the ground or other support and the elongated core structure extending upwardly from the base anchor structure, with the upper end spaced above the base anchor structure.

Surveillance equipment is carried by the elongated core structure.

The apparatus also includes an elongated enclosure having a bottom end portion and a top end portion, the bottom end portion secured to the base anchor structure and immovable relative thereto. The elongated enclosure extends upwardly from the base anchor structure along the length of the elongated core structure, with the top end portion disposed above the elongated core structure and the surveillance equipment carried by the elongated core structure.

The elongated enclosure surrounds the elongated core structure and the surveillance equipment carried thereby to protect the elongated core structure and the surveillance equipment carried thereby from wind or other ambient conditions, and the elongated enclosure is completely spaced from the elongated core structure and the surveillance equipment carried thereby whereby the elongated core structure and the surveillance equipment carried thereby are structurally isolated from the elongated enclosure and protected from vibration caused by wind impacting the elongated enclosure.

The present invention is characterized by its relative low cost and ease of installation as compared to prior art devices. Furthermore, the apparatus incorporates a number of features which contribute to its versatility and reliability. Maintenance is low and low cost.

Other features, advantages and objects of the present invention will become apparent with reference to the following description and accompanying drawings.

BRIEF DESCRIPTION OF DRAWINGS

FIG. 1 is a perspective view of base anchor structure constructed in accordance with the teachings of the present invention positioned in the ground and extending upwardly therefrom;

FIG. 2 is a view similar to FIG. 1, but illustrating an alternative embodiment of base anchor structure;

FIG. 3 is a view similar to FIGS. 1 and 2, but illustrating another embodiment of the base anchor structure including a base pad on the ground;

FIG. 4 illustrates a fourth embodiment of the base anchor structure wherein anchor bolts are utilized to secure this embodiment to a concrete pad in the ground;

FIG. 11 is a perspective view of the upper end of the elongated core structure including a camera support platform supporting four cameras above an array of lights;

FIGS. 12A and 12B are, respectively, side elevational and top plan views of one of the cameras including a flexible, adjustable camera support enabling the position of the camera to be changed as indicated by the double-headed arrows and dash line representation of the camera in these figures;

FIG. 13 is a perspective view of the upper end of the elongated enclosure shown in FIGS. 5 and 7 with the relative positions of the cameras and lights illustrated in broken lines;

FIG. 14 is an exploded, perspective view of the cap of the elongated enclosure illustrated in FIGS. 5, 7 and 13 prior to attachment of the cap to the rest of the elongated enclosure;

FIG. 20 illustrates another embodiment of base anchor structure prior to the pole thereof receiving the lower end of elongated core structure in the nature of a pipe member;

FIG. 21 is an exploded, perspective view of the pipe member of FIG. 20 positioned in the base anchor structure and supporting a camera and infrared sensor preparatory to an embodiment of elongated enclosure of single piece, plastic tubular construction being positioned in place and secured to the base anchor structure;

FIG. 22 is an elevational, cross-sectional view illustrating the elongated enclosure of FIG. 21 in the process of being secured in place on the base anchor structure and locked thereto;

FIG. 23 is a view similar to FIG. 7, but illustrating the effect of wind on the embodiment of the invention of FIGS. 20-22; and FIG. 24 is an elevational view showing details of metal grid and wire screen layers covering an opening in the elongated structure of FIG. 21.

MODES FOR CARRYING OUT THE INVENTION

Figure 5:
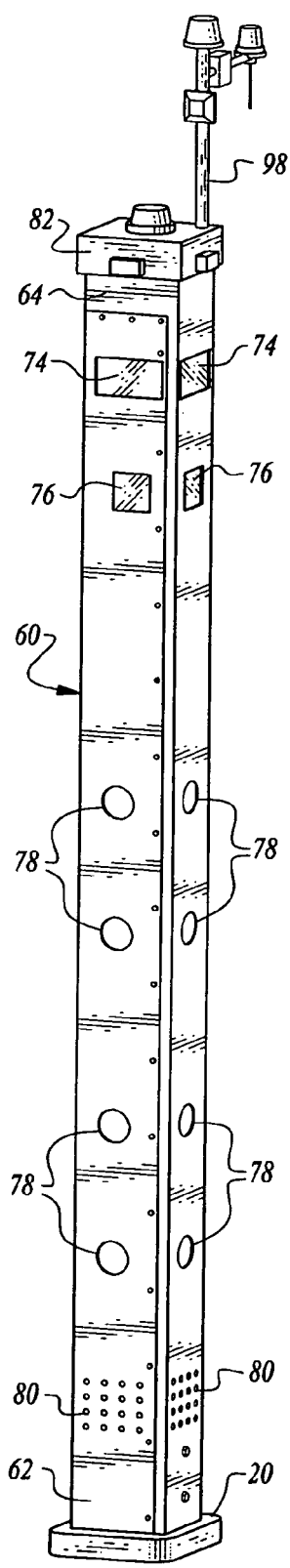
FIG. 5 is a perspective view of a preferred form of elongated enclosure of the device attached to the base pad shown in FIG. 3, a door of the elongated enclosure being closed.

As indicated above and explained in more detail below, three key components are utilized in the system of this invention: Base anchor structure, elongated core structure holding surveillance equipment and an elongated enclosure.

FIG. 1 illustrates a simple form of base anchor structure 10 which consists of a short pole 12 extending from the ground. Four spacer elements in the form of pipes 14 are threadedly engaged with the pole. The distances of the distal ends of the pipes relative to the pole may be adjusted by rotating the pipes as illustrated by the arrows in FIG. 1. In FIG. 1 the pole 12 is round and suitably formed of metal, although the pole may be made in wide variety of shapes and from different materials as desired. The pole can be embedded into the ground by conventional means, such as placing it in a hole and setting it in concrete or by simply driving the pole or placing it directly in the ground without concrete as shown in FIG. 1. The size of the pole and the depth of embodiment is a function of the structural load created by the other components of the invention and the various loadings applied to the elongated enclosure.

FIG. 2 illustrates another embodiment of the base anchor structure in which the pole is square and may for example be made out of wood. In this embodiment 10A, threaded metal bases 16 are screwed to the sides and pipes 14 threaded into place.

Holes (not shown) of the same diameter of the spacer pipes 14 are drilled through the wood post to accommodate through bolts to be described below.

FIG. 3 illustrates another embodiment of base anchor structure 10B which incorporates a pole 18 in the form of a hollow square metal tube having four spacer elements or pipes 14 threadedly engaging pole 18. This embodiment also includes a base pad 20 of concrete, metal or other suitable material with a square center hole accommodating pole 18 and a plurality of smaller holes or throughbores 22 spaced from the square hole in the center. The pole is not attached to the base pad.

For dirt ground installation, an anchor pole can be embedded into the ground by means of any conventional approach. It can for example be driven directly into the ground using a sledgehammer by hand, a jack hammer with an adaptor for post driving, or a regular post driver. An appropriate jack hammer adaptor or post driver chuck adaptors should be used to drive the pole of a particular size and shape. A post driver can be a simple manual type, pneumatic or hydraulic. For larger poles and harder soil conditions, more powerful post drivers may be necessary. For most small to medium sized poles, one-man, hand-held post drivers or jack hammers with adaptors can be used. For large poles, post drivers mounted on a truck or other platforms can be used. Since the anchor pole is relatively short and light, installing it can be a single man operation even with vehicle mounted post drivers, thus yielding large labor efficiency as compared to other pole installation methods, which often require more time and greater effort.

It is important that the anchor pole be checked for good vertical alignment from all directions during the driving process, as adjustment can be difficult after the pole is deeply driven into the ground. A simple tool such as a level placed against the sides of the pole base is an effective means to achieve this goal. For normal or soft soil, driving solid post is relatively easy. For harder ground, steel hollow tubes can be more appropriate as the small cross-sectional areas of the shapes can increase driving contact pressure for a given contact area. Further, for permanent or strong load conditions, metal pole material such as corrosion-protected steel is a good choice. Due to the relative ease of driving a pole into the ground, one can easily see that this invention can be highly efficient. For tall or large enclosure structures, the anchor pole needs to be driven deep into the ground.

The apparatus constructed in accordance with the teachings of the present invention can also be mounted on rigid surfaces such as concrete and rigid decks made of wood or steel.

FIG. 4 illustrates an embodiment 10C of the invention wherein a rectangular metal pole 24 is utilized. In this embodiment, pipe segments 26 are welded or otherwise secured to the pole 24. A metal base plate 28 and braces 30 are welded to the bottom of pole 24. In the embodiment illustrated, holes (not shown) in the base plate 28 accommodate anchor bolts 32 which project upwardly from and are embedded in a concrete pad 34 in the ground. The anchor bolt locations should be chosen to correspond and be in registry with anchor bolt holes at the base of the elongated core structure of the invention so that it too can be secured to the anchor bolts by nuts. Since there is zero movement at the anchor bolts, any movement of the anchor pole 24 (which is connected to the movable elongated enclosure) will not be transferred to the elongated core structure.

Referring now to FIGS. 6-11, elongated core structure 40 of the present invention is illustrated and identified by reference numeral 40. Elongated core structure 40 is in the form of an elongated framework having a lower end 42 and an upper end 44. The elongated core structure has a plurality of compartments extending along the length thereof and is utilized to house and support surveillance equipment and equipment associated therewith, such as electrical and electronic equipment associated with power supply systems including those for power regulation, charging, backup-power and batteries, sensors such as motion sensors and photoelectric beam sensors, as well as vital electronics such as computer, communications equipment, control circuitry, audio and video equipment, as well as a camera platform for mounting cameras.

At the upper end of the disclosed embodiment, is a camera support platform 46 supporting a plurality of cameras 48, typically video cameras. The cameras include adjustable, flexible camera supports 50 extending upwardly from the platform 46. As shown in FIGS. 12A and 12B, these camera supports allow the cameras to be positioned as desired. As shown in FIG. 11, a plurality of lights 52 are disposed under platform 46. A plurality of service monitor connectors 54 depend from the platform and are utilized to provide operative interconnection with the cameras. In the arrangement illustrated, the platform and lights are mounted on a shaft 55 extending upwardly from the framework portion of the elongated core structure.

Figure 9:
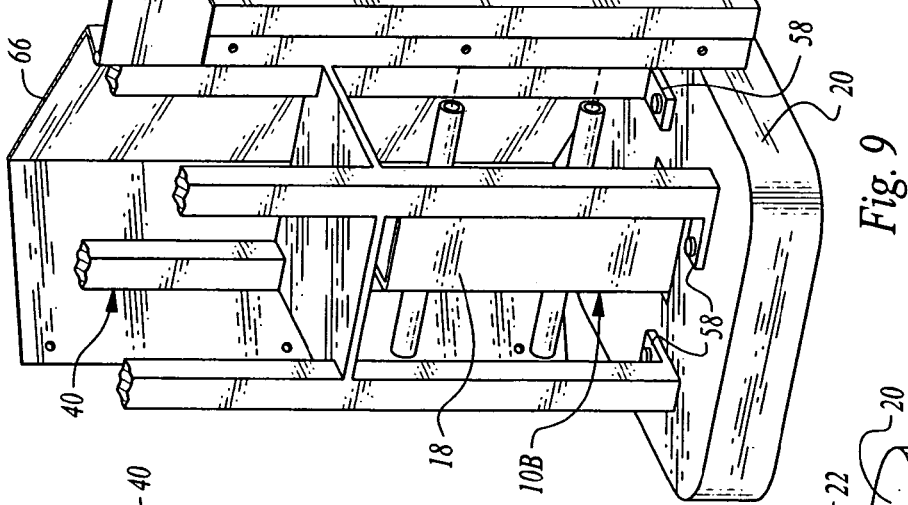
Figure 8:
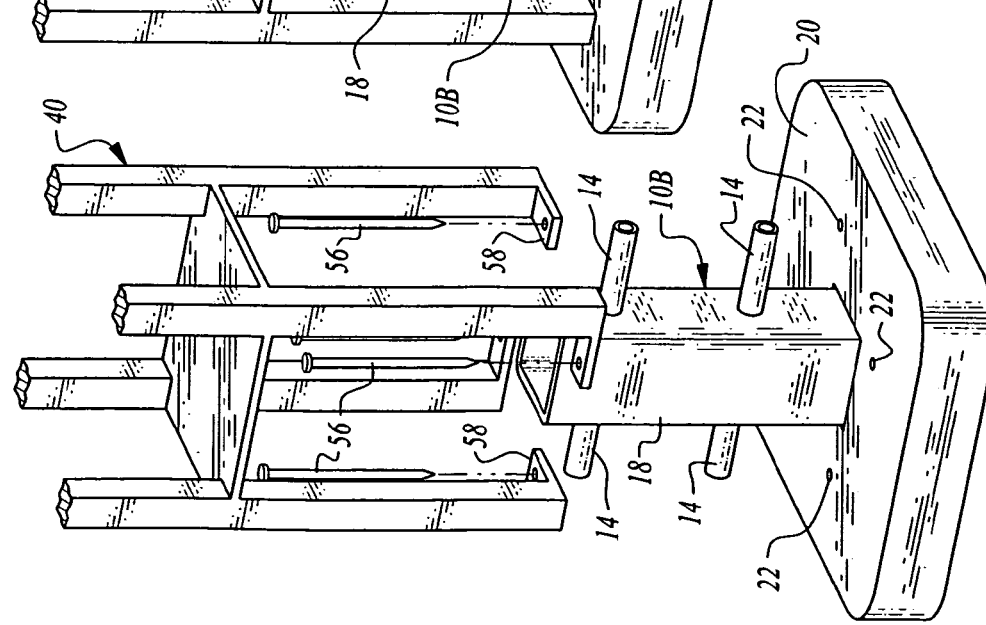

FIGS. 8 and 9 illustrate installation of the elongated core structure relative to the base anchor structure. As shown in FIG. 8, the elongated core structure 40 is placed directly above the base pad 20 and then secured to the ground with shallow anchor pins 56 which are driven into the ground through holes 22. The elongated core structure is structurally isolated from the base anchor structure pole 18 and pipes 14. Since the base pad 20 is not directly connected to the pole 18, any movement of the pole will not be transferred to the elongated core structure.

The holes of the elongated core structure at the bottom thereof are in laterally projecting extensions or feet 58 which rest directly on base pad 20.

As will be seen below, any wind vibration on the elongated enclosure and the base anchor structure attached thereto will not be passed along to the elongated core structure and surveillance equipment supported thereby. The shallow anchor pins prevent the elongated core structure from accidentally being moved during service or during camera adjustment. Deep anchor is not necessary as blowing wind forces will be fully absorbed by the elongated enclosure and transferred to the base anchor structure and then to the ground. In earthquake regions, deeper anchors for the elongated core structure can be used. However, from the safety standpoint it is not a must for the following reason. The elongated enclosure of the invention is structurally anchored to the ground, creating an anti-collapse restraint for the elongated core structure. In order for the elongated core structure to collapse, its center of gravity must be moved beyond its base. Since the space gap between the elongated core structure and the elongated enclosure is limited, even if the elongated core structure is knocked off its shallow anchors in an earthquake, the elongated enclosure will prevent it from tipping. Therefore, in earthquake areas, a strong and deep base anchor structure is necessary, but such does not apply to the anchors for the elongated core structure.

In the arrangement illustrated, the cameras are close together in a tight area and could be knocked out of alignment when unplugging and plugging of the video connectors during the camera adjustment process, this problem is solved by the service monitor connectors at the camera platform as described above. With the addition of the service monitor connectors to the elongated core structure, all the cameras can be adjusted with ease.

The remaining critical component of the surveillance apparatus is an elongated enclosure. Referring now to FIGS. 5, 7, 9, 10 and 13-15. A preferred elongated enclosure is designated by reference numeral 60. Elongated enclosure 60 is essentially in the shape of a tube with a square cross-section, the tube being elongated and substantially closed at its upper end. The elongated enclosure has a bottom end portion 62 and a top end portion 64. The bottom end portion is secured to base anchor structure 10B and immovable relative thereto. The elongated enclosure extends upwardly from the base anchor structure along the length of the elongated core structure, with the top end portion disposed above the elongated core structure and the surveillance equipment including cameras 48, carried by the elongated core structure. The elongated enclosure surrounds the elongated core structure and the surveillance equipment carried thereby to protect the elongated core structure and the surveillance equipment carried thereby from wind and other ambient conditions. The elongated enclosure is completely spaced from the elongated core structure and the surveillance equipment carried thereby whereby the elongated core structure and the surveillance equipment carried thereby are structurally isolated from the elongated enclosure and protected from vibration caused by wind impacting the elongated enclosure.

The elongated enclosure has a "J" shaped hinged door 66. FIG. 9 shows hinged door 66 swung open, as does FIG. 6 which illustrates another and closely related embodiment of the elongated enclosure. The wide opening created when the door is swung open makes it easy to encase the elongated core structure and surveillance and related equipment. The hinged door also makes it easy to service and maintain the equipment. To reduce cost, in lieu of the J-shaped hinge door, a piece of J-shaped sheet metal panel can be used and screwed on with vandal-resistant screws to form a square tube. A tube could also be made from curved sheet metal to create a round enclosure, but the fabrication cost is higher.

Figure 10:
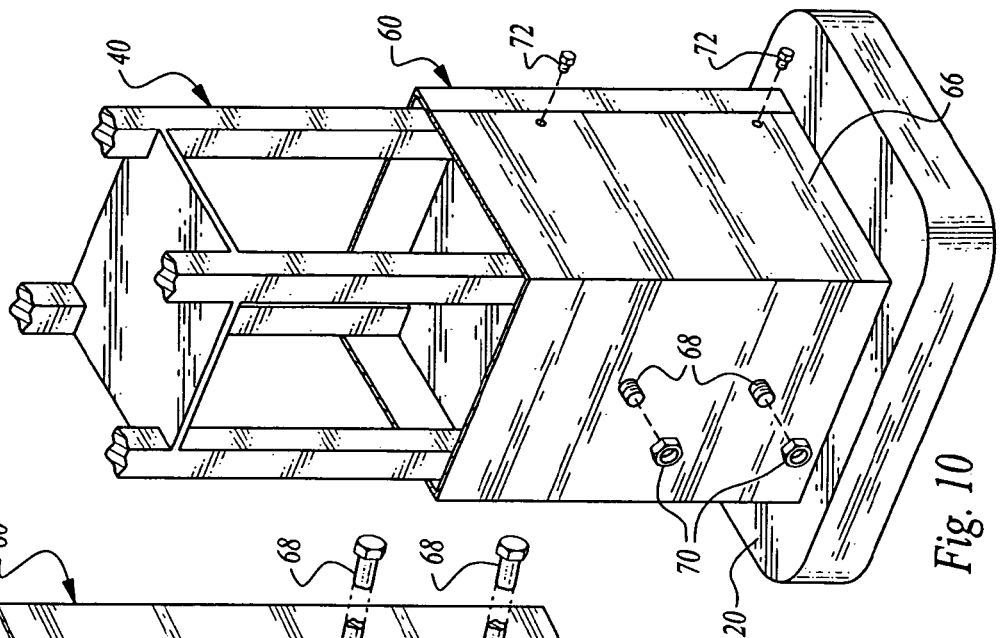
FIGS. 8-10 illustrate sequential steps carried out when attaching the elongated core structure and elongated enclosure to the base pad of the base anchor structure embodiment of FIG. 3, the lower or bottom portions of the elongated core structure and elongated enclosure being shown.

FIGS. 9 and 10 show the elongated enclosure 60 being attached to base anchor structure 10B. The enclosure with door open is slipped around the elongated core structure and bolted down by two through bolts 68 which pass through openings in opposed sides of the elongated enclosure, through the aligned passageways formed by the pipes 24 of the two pairs of pipes illustrated in the figures as well as through the center of hollow pole 18. Nuts 70 are utilized to complete the attachment process. Screws 72 are used to secure door 66 in closed condition.

A plurality of camera windows 74 are placed near the top of the elongated enclosure, window placement corresponding to that of the cameras 48. Openings 76 are provided for the lights 52. Also, windows 78 are provided for a variety of sensors or as additional camera ports. Vent holes are provided in the areas 80 of the elongated enclosure sides.

Figure 7:
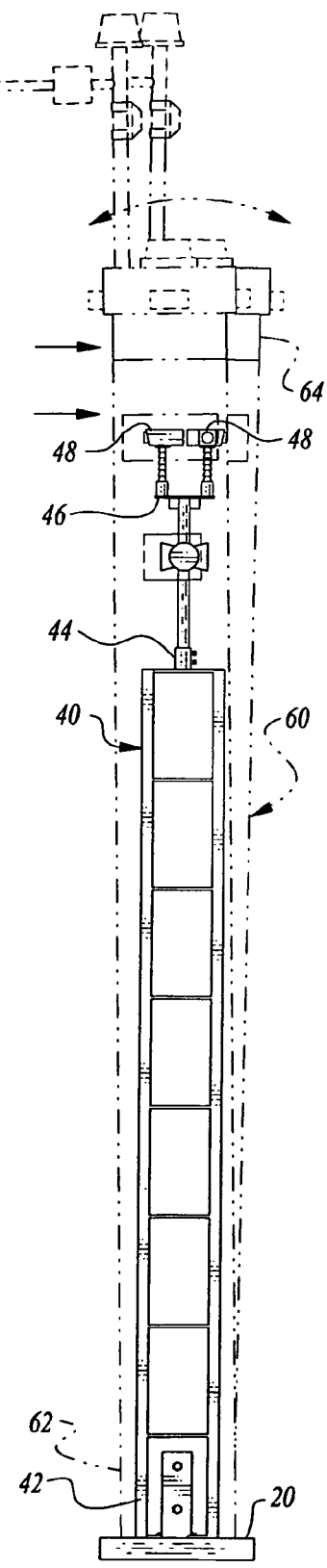
FIG. 7 is a perspective view of the arrangement of FIG. 5, but illustrating the elongated core structure and surveillance equipment in solid lines and the elongated enclosure in phantom lines, showing diagrammatically the effect of wind on the elongated enclosure while the elongated core structure and surveillance equipment remain unaffected by the vibratory effects of the wind.

FIG. 7 is a somewhat diagrammatic presentation illustrating how deflection and vibration of elongated enclosure 60 by wind forces is completely removed or separated from the elongated core structure and surveillance equipment supported thereby. From the structurally efficiency standpoint of resisting wind load, for the same amount of cross-sectional area, an elongated enclosure tube with a larger size but thinner wall is much stronger than one of the smaller size and thicker wall because of its higher moment of inertia and modulus of elasticity. However, the extrusion process from which tubes are often made, requires certain wall thickness for a given tube size. This thickness is often much more than necessary for wind load resistance. The elongated enclosure of the embodiment just described is created by assembling sheet metal. It can be thin and large, resulting in much higher structural efficiency for wind blow resistance at less weight and cost. Moreover, since the elongated enclosure is isolated from the equipment, it can use thinner material and accept more wind blow deflection.

Figure 15:
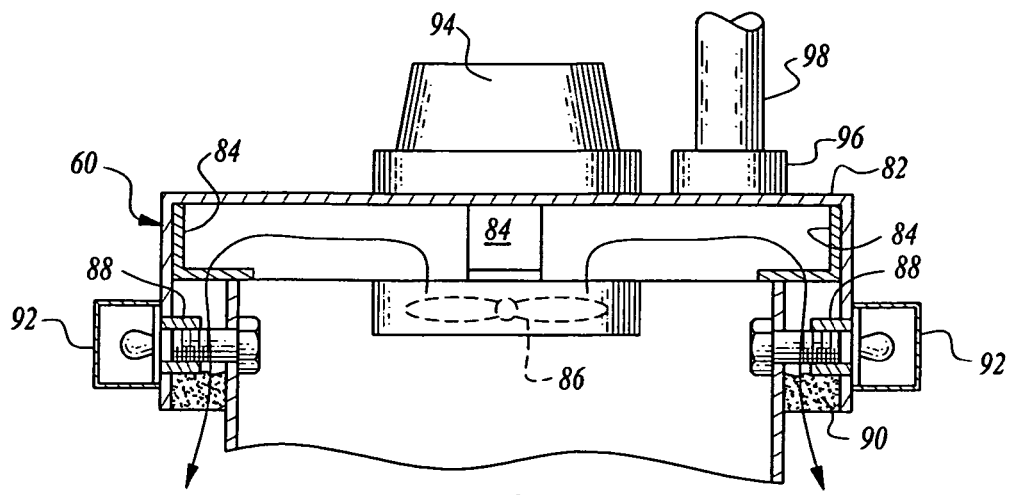
FIG. 15 is an enlarged, cross-sectional view taken along the line 15-15 of FIG. 13 and illustrating a ventilation fan associated with the cap and air flow caused thereby.
Figure 16:
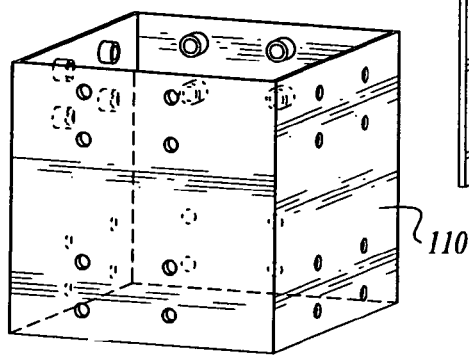
FIG. 16 is a perspective view of an interior splice connector which may be utilized to connect sections of an elongated enclosure embodiment incorporating multiple sections along the length thereof.
Figure 18:
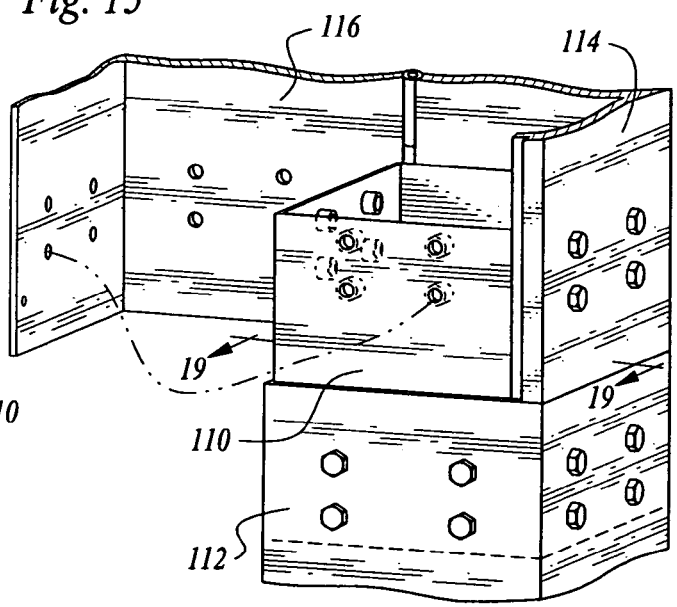
FIG. 18 illustrates the interior splice connector connecting two sections of an elongated core structure, one of the sections including a door illustrated in open condition.
Figure 17:
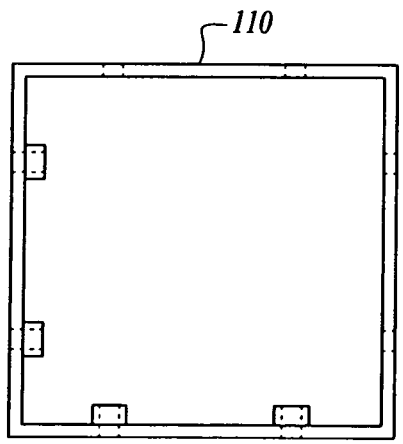
FIG. 17 is a top, plan view of the interior splice connector.
Figure 19:
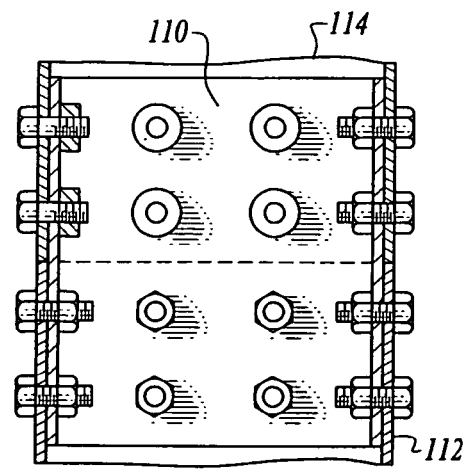
FIG. 19 is a cross-sectional view taken along the line 19-19 of FIG. 18 with the door closed and secured in place.

In elongated enclosure 60, the top end thereof comprises a cap 82 as may be seen with particular reference to FIGS. 13, 14 and 15, the cap has four L-shaped stops 84 which are welded on the inside walls of the cap so that the lid does not completely close off the top of the tube portion of the elongated enclosure. This creates a large air gap through which hot air is allowed to escape the tube, such air flow being illustrated by arrows in FIG. 15. FIG. 15 also shows the use of a fan 86 to promote air flow. Air passes into the tube through the vents in areas 80 near the bottom of the tubular portion thereof. Four rivet nuts 88 set the gap spacing between the walls of the cap and the tube enclosure section walls. A light foam filter ring 90 or other means can be used to fill this gap to allow air ventilation while preventing insects and dust from entering the enclosure. Side-marker lights 92 are used in this embodiment to cover the rivet nut holes on the cap. The rivet nuts allow the cap to be secured from inside the enclosure for improved security. A warning light 94 is mounted at the top of the cap. As discussed, the elongated enclosure is structurally isolated from the elongated core structure, but any electrical and electronic components between them can be connected with traditional plugs and sockets.

A unique expansion coupler or socket 96 is located at a corner of the cap. An accessory expansion pole 98 is threaded to the coupler or inserted therein and held by friction or fasteners, the pole 98 employed to mount various accessories, such as antennae, additional lights, sensors, and other electronic equipment. Since the cap and the underlying enclosure are structurally strong, piggybacking on them is an efficient way to add versatility to this system.

Figure 6:
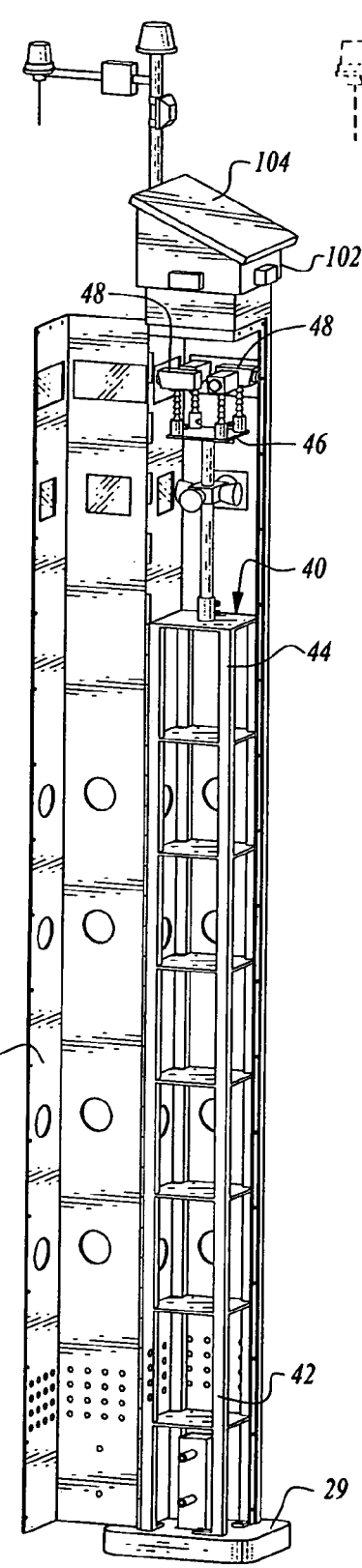
FIG. 6 illustrates an elongated enclosure with the door open to illustrate elongated core structure also secured to the ground through the base pad, the embodiment of the elongated enclosure in FIG. 6 differing from that of FIG. 5 only in that the embodiment of FIG. 6 employs a top cap including a solar panel whereas the embodiment of FIG. 5 does not.

FIG. 6 illustrates another embodiment of the invention which is the same as that shown in FIG. 5, except for the fact that the cap 102 includes a solar panel 104. The mounting method can be same as the cap of FIG. 5 embodiment. The angle of the solar panel can be set according to the latitude of the deployment location. An accessory expansion pole can be added, and it should be mounted close to the top side of the solar panel (north side) with sufficient height so as not to cast any shadows on the solar panel by the accessories. Solar panels with polymer coating instead of glass are preferred as they are virtually unbreakable.

Referring now to FIGS. 16-19, rather than use long sheets of sheet metal to form long outer elongated enclosures, an alternative for reducing handling weight and eliminating or reducing stocking multiple lengths of sheet metal, would be to use shorter sheets which can be assembled on site. FIGS. 16-19 illustrate an interior splice connector 110 with eight holes formed in each side thereof. The bottom half of the holes are bolted to the top of the lower section 112. Half of the top half holes are bolted to the stationary part of the upper enclosure section 114. The other half of the top half holes is equipped with nuts for the J door 116 (or panel). Once all the splice bolts are secured and the J door (or panel) is closed, the bottom of the J door (or panel) is screwed to the interior splice connector through the nuts to form a rigid tube. Sealant should then be applied to seal the splice joint.

Referring now to FIGS. 20-23, a simplified embodiment of apparatus constructed in accordance with the teachings of the present invention is illustrated. In this embodiment the elongated core structure consists of a pole 122 bolted directly to base anchor structure 124 with the lower end of pole 122 in the pole of the anchor base structure. In this illustration, only a single camera 126 and a single infrared motion sensor 128 are mounted. This embodiment of the invention is useful in areas not having strong winds and the equipment mounted is limited.

This simplified elongated core structure yields significant cost savings due to its simple structure, yet it maintains wind isolation to a great extent.

Except for strong wind movement, the elongated core structure and equipment supported thereby is not affected significantly by wind caused vibration. In a cantilever structure, such as that of the base anchor structure and pole, deflection is progressively more pronounced the further the distance from the ground. This is due to the cumulative stress and strain on the structural elements of the cantilever structure under lateral load. Since the pole 122 is connected very close to the ground, its movement is limited. This is the case even when the upper portions of the elongated enclosure 130 utilized in this embodiment experience significant cumulative deflection under lateral wind load.

For limited equipment on the elongated core structure yet 100% wind isolation is desired, such as when a camera is mounted very high, a second pole anchor (not shown) can be driven into the ground for mounting the elongated core structure. The second anchor need not be deeply embedded as it faces no wind load. The elongated core structure can be bolted to the separate anchor.

The elongated enclosure 130 of this embodiment is round and formed of plastic similar to widely used bollard covers. These covers are made in different diameters and heights, ideal for simple elongated core structures. They are tube enclosures with one end open and one end closed. They are also sturdy enough to endure abuse and vandalism.

The enclosure 130 is slipped over the elongated core structure from the top and bolted down with two through bolts 132 and locked with padlocks 134 through bore holes in the bolts.

The camera window 136 is made of polycarbonate for high impact resistance. An opening 138 covered by metal grid 140 and wire screen 142 layers (see FIG. 24) is a unique approach to protecting outdoor infrared sensors. Such sensors are normally unprotected because any glass or plastic window employed will prevent the sensors from detecting thermal changes. The wire screen prevents insects from entering the enclosure and a metal grid employed therewith prevents vandalism. These components are secured to enclosure 130 by rivets or other suitable fastening means and are innovative approaches for protecting outdoor infrared sensors. Infrared sensors can "see" through a bug screen and metal grid.

The invention claimed is:

1. Surveillance apparatus comprising, in combination:
   base anchor structure including a pole fixed in place relative to the ground or other support and extending upwardly from the ground or other support;
   elongated core structure having a lower end and an upper end, said lower end fixed against movement relative to said ground or other support and said elongated core structure extending upwardly from said base anchor structure, with said upper end spaced above said base anchor structure;
   surveillance equipment carried by said elongated core structure; and
   an elongated enclosure having a bottom end portion and a top end portion, said bottom end portion secured to said base anchor structure and immovable relative thereto, said elongated enclosure extending upwardly from said base anchor structure along the length of said elongated core structure, with said top end portion disposed above said elongated core structure and said surveillance equipment carried by said elongated core structure, said elongated enclosure surrounding said elongated core structure and said surveillance equipment carried thereby to protect said elongated core structure and the surveillance equipment carried thereby from wind and other ambient conditions, and said elongated enclosure being completely spaced from and not in engagement with said elongated core structure and the surveillance equipment carried thereby whereby said elongated core structure and the surveillance equipment carried thereby are structurally isolated from said elongated enclosure and protected from vibration caused by wind impacting said elongated enclosure, said anchor structure additionally including at least one spacer element extending from said pole to a location spaced outwardly from said pole and connected to said elongated enclosure.

2. The surveillance apparatus according to claim 1 wherein said pole is fixedly positioned in said ground or other support and wherein said anchor member additionally includes at least one pair of spacer elements, the spacer elements of said at least one pair of spacer elements extending in different directions to locations spaced outwardly of said pole and having distal ends connected to said elongated enclosure at said bottom end portion thereof.

3. The surveillance apparatus according to claim 2 wherein said spacer elements have proximal ends threadedly connected to said pole to vary the distance of said distal ends from said pole, said surveillance apparatus additionally comprising fasteners fastening said elongated enclosure to said spacer elements.

4. The surveillance apparatus according to claim 2 wherein said base anchor structure additionally includes a base pad from which said pole projects in an upward direction, said elongated core structure lower end attached to said base pad at locations spaced outwardly from said pole, said elongated core structure having feet engaging said base pad and said base pad and said feet defining holes accommodating fasteners fastening said elongated core structure to said ground or other support.

5. The surveillance apparatus according to claim 1 wherein said elongated core structure has a plurality of compartments along the length thereof for receiving surveillance equipment and other types of equipment.

6. The surveillance apparatus according to claim 5 wherein said elongated enclosure includes a door movable between an open position allowing an individual access to said compartments and any equipment held thereby and a closed position preventing access to said compartments by an individual.

7. The surveillance apparatus according to claim 1 wherein said elongated enclosure includes at least one camera window.

8. The surveillance apparatus according to claim 1 wherein said elongated enclosure includes one or more windows for sensors in the elongated enclosure.

9. The surveillance apparatus according to claim 2 wherein the lower end of said elongated core structure defines an interior, with said pole located in said interior and the distal ends of said spacer elements located outside said interior.

10. The surveillance apparatus according to claim 1 wherein said surveillance equipment additionally includes a plurality of lights adjacent to said cameras.

11. The surveillance apparatus according to claim 3 wherein said spacer elements of said at least one pair of spacer elements define aligned passageways, said fasteners including a through bolt passing completely through said aligned passageways and through the elongated enclosure.

12. The surveillance apparatus according to claim 1 wherein said elongated core structure is an open framework.

13. The surveillance apparatus according to claim 2 wherein said elongated core structure comprises a pipe member positioned in said pole.

14. The surveillance apparatus according to claim 4 wherein said base pad is not attached to said pole.

15. Surveillance apparatus comprising, in combination:
base anchor structure extending upwardly from the ground or other support;
elongated core structure having a lower end and an upper end, said lower end fixed against movement relative to said ground or other support and said elongated core structure extending upwardly from said base anchor structure, with said upper end spaced above said base anchor structure;
surveillance equipment carried by said elongated core structure; and
an elongated enclosure having a bottom end portion and a top end portion, said bottom end portion secured to said base anchor structure and immovable relative thereto, said elongated enclosure extending upwardly from said base anchor structure along the length of said elongated core structure, with said top end portion disposed above said elongated core structure and said surveillance equipment carried by said elongated core structure, said elongated enclosure surrounding said elongated core structure and said surveillance equipment carried thereby to protect said elongated core structure and the surveillance equipment carried thereby from wind and other ambient conditions, and said elongated enclosure being completely spaced from said elongated core structure and the surveillance equipment carried thereby whereby said elongated core structure and the surveillance equipment carried thereby are structurally isolated from said elongated enclosure and protected from vibration caused by wind impacting said elongated enclosure, said elongated enclosure including a metal grid and wire screen in an opening for allowing passage therethrough of infrared energy.

16. Surveillance apparatus comprising, in combination:
base anchor structure extending upwardly from the ground or other support;
elongated core structure having a lower end and an upper end, said lower end fixed against movement relative to said ground or other support and said elongated core structure extending upwardly from said base anchor structure, with said upper end spaced above said base anchor structure;
surveillance equipment carried by said elongated core structure; and
an elongated enclosure having a bottom end portion and a top end portion, said bottom end portion secured to said base anchor structure and immovable relative thereto, said elongated enclosure extending upwardly from said base anchor structure along the length of said elongated core structure, with said top end portion disposed above said elongated core structure and said surveillance equipment carried by said elongated core structure, said elongated enclosure surrounding said elongated core structure and said surveillance equipment carried thereby to protect said elongated core structure and the surveillance equipment carried thereby from wind and other ambient conditions, and said elongated enclosure being completely spaced from said elongated core structure and the surveillance equipment carried thereby whereby said elongated core structure and the surveillance equipment carried thereby are structurally isolated from said elongated enclosure and protected from vibration caused by wind impacting said elongated enclosure, said elongated enclosure defining air vent holes.

17. Surveillance apparatus comprising, in combination:
base anchor structure extending upwardly from the ground or other support;
elongated core structure having a lower end and an upper end, said lower end fixed against movement relative to said ground or other support and said elongated core structure extending upwardly from said base anchor structure, with said upper end spaced above said base anchor structure;
surveillance equipment carried by said elongated core structure;
an elongated enclosure having a bottom end portion and a top end portion, said bottom end portion secured to said base anchor structure and immovable relative thereto, said elongated enclosure extending upwardly from said base anchor structure along the length of said elongated core structure, with said top end portion disposed above said elongated core structure and said surveillance equipment carried by said elongated core structure, said elongated enclosure surrounding said elongated core structure and said surveillance equipment carried thereby to protect said elongated core structure and the surveillance equipment carried thereby from wind and other ambient conditions, and said elongated enclosure being completely spaced from said elongated core structure and the surveillance equipment carried thereby whereby said elongated core structure and the surveillance equipment carried thereby are structurally isolated from said elongated enclosure and protected from vibration caused by wind impacting said elongated enclosure; and
lock structure for selectively locking said elongated enclosure to said base anchor structure.

18. Surveillance apparatus comprising, in combination:
base anchor structure extending upwardly from the ground or other support;
elongated core structure having a lower end and an upper end, said lower end fixed against movement relative to said ground or other support and said elongated core structure extending upwardly from said base anchor structure, with said upper end spaced above said base anchor structure;
surveillance equipment carried by said elongated core structure; and
an elongated enclosure having a bottom end portion and a top end portion, said bottom end portion secured to said base anchor structure and immovable relative thereto, said elongated enclosure extending upwardly from said base anchor structure along the length of said elongated core structure, with said top end portion disposed above said elongated core structure and said surveillance equipment carried by said elongated core structure, said elongated enclosure surrounding said elongated core structure and said surveillance equipment carried thereby to protect said elongated core structure and the surveillance equipment carried thereby from wind and other ambient conditions, and said elongated enclosure being completely spaced from said elongated core structure and the surveillance equipment carried thereby whereby said elongated core structure and the surveillance equipment carried thereby are structurally isolated from said elongated enclosure and protected from vibration caused by wind impacting said elongated enclosure, said surveillance equipment including at least one camera and said elongated core structure including a camera support platform, said at least one camera including an adjustable, flexible camera support extending from said platform for allowing adjustment of the position of the at least one camera.

19. The surveillance apparatus according to claim 18 wherein said surveillance equipment includes a plurality of cameras, said camera support platform having a plurality of service monitor connectors operatively associated with said cameras.

20. Surveillance apparatus comprising, in combination:
base anchor structure extending upwardly from the ground or other support;
elongated core structure having a lower end and an upper end, said lower end fixed against movement relative to said ground or other support and said elongated core structure extending upwardly from said base anchor structure, with said upper end spaced above said base anchor structure;
surveillance equipment carried by said elongated core structure; and
an elongated enclosure having a bottom end portion and a top end portion, said bottom end portion secured to said base anchor structure and immovable relative thereto, said elongated enclosure extending upwardly from said base anchor structure along the length of said elongated core structure, with said top end portion disposed above said elongated core structure and said surveillance equipment carried by said elongated core structure, said elongated enclosure surrounding said elongated core structure and said surveillance equipment carried thereby to protect said elongated core structure and the surveillance equipment carried thereby from wind and other ambient conditions, and said elongated enclosure being completely spaced from said elongated core structure and the surveillance equipment carried thereby whereby said elongated core structure and the surveillance equipment carried thereby are structurally isolated from said elongated enclosure and protected from vibration caused by wind impacting said elongated enclosure, said top end portion of said elongated enclosure comprising a cap forming an air passageway providing air flow communication between the interior of said elongated enclosure and the ambient atmosphere.

21. The surveillance apparatus according to claim 20 wherein said cap additionally includes filter material in said air passageway.

22. The surveillance apparatus according to claim 20 wherein said cap additionally includes a ventilation fan for promoting air flow through said air passageway.

23. The surveillance apparatus according to claim 20 wherein said cap is connected to the rest of said elongated enclosure by rivet nuts spacing said cap from the rest of said elongated enclosure.

24. The surveillance apparatus according to claim 23 including lights covering rivet nut holes in the cap.

25. The surveillance apparatus according to claim 20 additionally comprising at least one solar panel on said cap for generating electricity for operating said surveillance equipment.

26. Surveillance apparatus comprising, in combination:
base anchor structure extending upwardly from the ground or other support;
elongated core structure having a lower end and an upper end, said lower end fixed against movement relative to said ground or other support and said elongated core structure extending upwardly from said base anchor structure, with said upper end spaced above said base anchor structure;

surveillance equipment carried by said elongated core structure;

an elongated enclosure having a bottom end portion and a top end portion, said bottom end portion secured to said base anchor structure and immovable relative thereto, said elongated enclosure extending upwardly from said base anchor structure along the length of said elongated core structure, with said top end portion disposed above said elongated core structure and said surveillance equipment carried by said elongated core structure, said elongated enclosure surrounding said elongated core structure and said surveillance equipment carried thereby to protect said elongated core structure and the surveillance equipment carried thereby from wind and other ambient conditions, and said elongated enclosure being completely spaced from said elongated core structure and the surveillance equipment carried thereby whereby said elongated core structure and the surveillance equipment carried thereby are structurally isolated from said elongated enclosure and protected from vibration caused by wind impacting said elongated enclosure, said top end portion of said elongated enclosure including a coupler member; and an extension pole coupled to said coupler member and extending upwardly from said elongated enclosure.

27. The surveillance apparatus according to claim 26 including accessory equipment connected to and supported by said extension pole.

28. Surveillance apparatus comprising, in combination:

base anchor structure extending upwardly from the ground or other support;

elongated core structure having a lower end and an upper end, said lower end fixed against movement relative to said ground or other support and said elongated core structure extending upwardly from said base anchor structure, with said upper end spaced above said base anchor structure;

surveillance equipment carried by said elongated core structure; and an elongated enclosure having a bottom end portion and a top end portion, said bottom end portion secured to said base anchor structure and immovable relative thereto, said elongated enclosure extending upwardly from said base anchor structure along the length of said elongated core structure, with said top end portion disposed above said elongated core structure and said surveillance equipment carried by said elongated core structure, said elongated enclosure surrounding said elongated core structure and said surveillance equipment carried thereby to protect said elongated core structure and the surveillance equipment carried thereby from wind and other ambient conditions, and said elongated enclosure being completely spaced from said elongated core structure and the surveillance equipment carried thereby whereby said elongated core structure and the surveillance equipment carried thereby are structurally isolated from said elongated enclosure and protected from vibration caused by wind impacting said elongated enclosure, said elongated enclosure including sheet metal sections joined by an inner connector sleeve.

\* \* \* \* \*